United States Patent [19]

Maeda et al.

[11] Patent Number: 4,926,491
[45] Date of Patent: May 15, 1990

[54] PATTERN RECOGNITION DEVICE

[75] Inventors: Kenichi Maeda, Kamakura; Hiroyuki Tsuboi, Yokohama; Yoichi Takebayashi, Chigasaki, all of Japan

[73] Assignee: Kabushiki Kaisha Toshiba, Kawasaki, Japan

[21] Appl. No.: 203,505

[22] Filed: Jun. 6, 1988

Related U.S. Application Data

[63] Continuation of Ser. No. 775,392, Sep. 12, 1985, abandoned.

[30] Foreign Application Priority Data

Sep. 17, 1984 [JP] Japan ................. 59-194411

[51] Int. Cl.$^5$ ............................................. G06K 9/67
[52] U.S. Cl. ........................................ 382/14; 382/10; 382/34; 382/36
[58] Field of Search ............... 364/513, 513.5; 381/36, 381/42, 43; 382/9, 10, 14, 15, 21, 30, 34, 36, 37, 38, 39, 41; 324/74 R; 434/185

[56] References Cited

U.S. PATENT DOCUMENTS

| | | | |
|---|---|---|---|
| 3,446,950 | 5/1969 | King et al. ........................... | 235/197 |
| 4,227,177 | 10/1980 | Moshier ................................ | 382/1 |
| 4,319,085 | 3/1982 | Welch et al. ......................... | 381/43 |
| 4,327,354 | 4/1982 | Persoon ................................ | 382/15 |
| 4,400,788 | 8/1983 | Myers et al. ......................... | 381/43 |
| 4,521,909 | 6/1985 | Wang ................................... | 382/14 |
| 4,593,367 | 6/1986 | Slack et al. .......................... | 382/15 |
| 4,651,289 | 3/1987 | Maeda et al. ........................ | 382/15 |

FOREIGN PATENT DOCUMENTS

| | | |
|---|---|---|
| 0085545 | 8/1983 | European Pat. Off. . |
| 105586 | 8/1981 | Japan . |
| 137483 | 10/1981 | Japan . |
| 129684 | 8/1983 | Japan . |

OTHER PUBLICATIONS

Systems, Computers Controls, vol. 2, No. 3, 1971, "A Nonsupervised Mixed Type Learning Machine" by Shimura et al.

*Primary Examiner*—Leo H. Boudreau
*Assistant Examiner*—Jose L. Couso
*Attorney, Agent, or Firm*—Foley & Lardner, Schwartz, Jeffery, Schwaab, Mack, Blumenthal & Evans

[57] ABSTRACT

A pattern recognition device is arranged to have learning of a reference pattern vector carried out in a recognition unit by making use of the pause periods in the recognition processing, without particularly providing a learning section for learning the reference pattern vector. Namely, a part or the entirety of the arithmetic processing unit where the recognition result is obtained in the recognition unit by collating the input pattern with the recognition dictionary, can be utilized as the learning portion of the reference pattern vector. In concrete terms, the operation of multiplication-accumulation (inner product) which represents the main operation in the recognition processing and the learning processing, can be carried out by means of similar processes of handling. Therefore, by utilizing the processing section for sum of the products operation, of the recognition unit, which is in the idle state for pattern recognition, it becomes possible to carry out learning the reference pattern vector efficiently in time, without forcibly interrupting the pattern recognition processing by formally setting a learning condition.

7 Claims, 9 Drawing Sheets

PATTERN RECOGNITION DEVICE

This application is a continuation of application Ser. No. 775,392, filed Sept. 12, 1985 now abandoned.

BACKGROUND OF THE INVENTION

1. Field of the Invention

The present invetion relates to a pattern recognition device which enables high accuracy recognition of input patterns through effective learning of reference pattern vectors.

2. Description of the Prior Art

Recent advancement in pattern recognition techniques, such as the character recognition, speech recognition, and drawing reading, is remarkable and includes the development of various pattern recognition devices like voice activated work processor (dictation machine) and handwritten character reading and inputting devices. In a pattern recognition device of this kind, the recognition for the input pattern is obtained generally by carrying out the processing of matching between a reference pattern vector which is prepared in advance and the input pattern. For this reason, in order to make high accuracy recognition for the input patterns, it becomes necessary to prepare a highly substantial reference pattern vector through learning of the reference pattern vector by collecting a large number of patterns that are used in practice and input patterns when the pattern recognition device is used. However, the fact that it is necessary to collect a large number of patterns in advance and that it requires enormous processing time for the learning processing of the reference pattern vector that utilizes the collected patterns, presents a major task to be accomplished. For instance, when learning is carried out by the K-L expansion of the syllable recognition carried out by the K-L expansion of the syllable reference pattern vector that consists of 101 categories represented as 256-dimensional vectors, for speech recognition of syllables, it requires about 5 hours of processing time even when used with a large high-speed computer with operation processing speed of 1 MIPS.

Now, conventionally, the pattern collection and the learning of the reference pattern vector are carried out generally in a different state from that for the recognition of input patterns. Namely, it is ordinarily done by switching the operational mode from the recognition condition to the learning condition. Thus, for example, in the on-line handwritten character reader, the user executes the learning of the reference pattern vector by interrupting the pattern recognition processing and by inputting the pattern for learning. For this reason, there was an inconvenience that the recognition processing for an input pattern cannot be executed during the learning processing of the reference pattern vector.

In addition, when recognition is made for the patterns of intermittently inputted human-spoken words, like in the voice activated word processor (dictation machine), the processing section for the sum of products operation for the recognition processing of the input pattern is active over only a certain fixed duration in which the patterns are inputted in the recognition condition. For the remaining times, in spite of its being in the recognition condition, it actually remains in the waiting condition for the patterns to be inputted, so that the arithmetic processing unit is in a paused state in effect. Therefore, time losses are produced and the arithmetic units of the recognition device operate at a lower efficiency.

On the other hand, to achieve recognition with high accuracy of the patterns inputted by an unspecified speaker or an unspecified writer, it is conceivable to collect the input patterns to be used for the recognition processing as the patterns for learning, and to carry out the learning of the reference pattern vector by these patterns. By so doing, it becomes possible to carry out an effective collection of the patterns for learning the reference pattern vector, as well as to achieve a substantiation of the reference pattern vector in an easy manner. However, in order to learn the numerous patterns that are collected in this manner by setting the learning condition, there will be many difficulties, for example, it requires an even larger amount of processing time.

SUMMARY OF THE INVENTION

An object of the present invention is to provide a pattern recognition device which makes it possible to carry out the learning of a reference pattern vector without interrupting the pattern recognition processing.

Another object of the present invention is to provide a pattern recognition device which enables one to improve the recognition factor of input patterns.

Another object of the present invention is to provide a pattern recognition device which enables the learning of a reference pattern vector for pattern recognition, in an efficient manner without loss of time.

Another object of the present invention is to provide a pattern recognition device which enables preparation of a highly reliable reference pattern vector in an efficient manner without putting a burden on the user.

Another object of the present invention is to provide a pattern recognition device which enables the effective use of the arithmetic processing unit for the operation of multiplication—accumulation, in a short duration.

A pattern recognition device in accordance with the present invention includes a reference pattern for recognition which registers in advance the reference pattern vector, a first arithmetic processing unit which carries out the operation of multiplication-accumulation (inner product) for recognition processing and/or the operation of multiplication-accumulation (inner product) for the learning processing of the reference pattern vector, a recognition operation control section which controls the first arithmetic processing unit and the dictionary memory, when carrying out the recognition processing, in order to carry out the operation of multiplication-accumulation (inner product) for recognition in the first arithmetic processing unit; a second arithmetic processing unit which carries out operations other than the operation of multiplication-accumulation (inner product) for recognition processing; a learning operation control section which controls the first arithmetic processing unit and the dictionary memory, when carrying out the learning processing, in order to carry out the operation of multiplication-accumulation (inner product) for learning in the first arithmetic processing unit; a third arithmetic processing unit which carries out operations other than the operation of multiplication-accumulation (inner product) for learning processing; a terminal equipment which carries out modification processing for the result of pattern recognition; an error/-reject memory section which records, for the purpose of learning processing, when a recognition rejection or a recognition error for a newly input pattern has occurred during the execution of the recognition processing or the learning processing in the recognition unit, the input pattern and the result of the matching processing between the input pattern and the reference pattern vector; a correlation matrix (characteristic kernel) memory section which memorizes, for the purpose of learning processing, the correlation matrix (characteristic kernel) for the correct category and the characteristc kernel for the erroneous category concerning the recognition rejection or the recognition error; an interim state memory section which memorizes the interim state in learning of the reference pattern vector at the recognition unit; and a control section which sorts out the information for modification from the terminal equipment, when the recognition processing is in a state of suspension after judging whether or not the recognition processing at the first arithmetic processing unit is in an idle state based on the signals from the recognition operation control section and the learning operation control section, to the recognition operation control section or the learning operation control section, in order to make it possible to learn the reference pattern vector at the first arithmetic processing unit.

These and other objects and advantages of the present invention will be more apparent from the following description of the preferred embodiments, taken in conjunction with the accompanying drawings.

BRIEF DESCRIPTION OF THE DRAWINGS

FIGS. 9 (a), (b) illustrates one example of Chinese characters to be recognized erroneously.

FIGS. 10 and 11 are timing charts for illustrating the timing of the control unit in FIG. 2.

DESCRIPTION OF THE PREFERRED EMBODIMENTS

Figure 1:
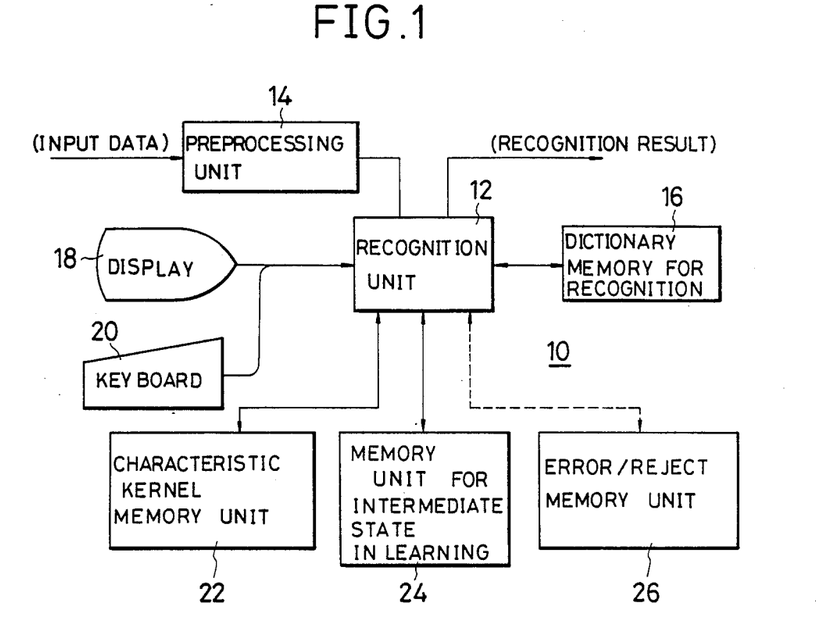
FIG. 1 is a simplified block diagram for a pattern recognition device embodying the present invention.
Figure 3:
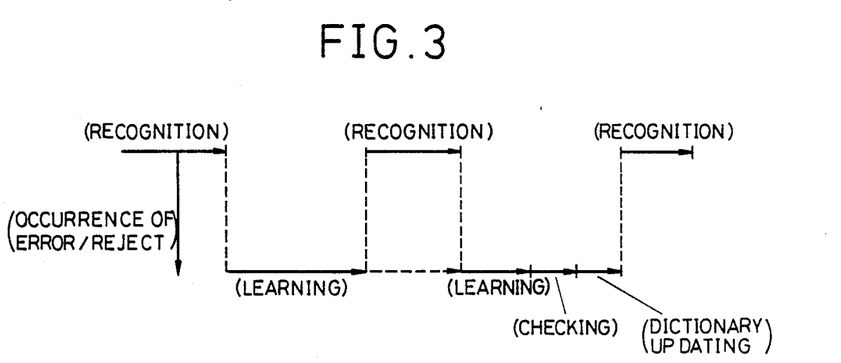
FIG. 3 is a timing chart for illustrating the timing of the operation of the pattern recognition device shown in FIG. 1.

Referring to FIG. 1, a pattern recognition device embodying the present invention is shown with reference numeral 10. The pattern recognition device 10 includes a recognition unit 12 having the functions of recognition processing and learning processing. As shown in FIG. 3 the learning of the reference pattern vector is executed by the processing section 12 in the pause period of recognition processing at the processing section 12, without a particular learning section for learning the reference pattern vector. That is, a part or the entirety of the arithmetic processing unit where recognition is achieved at the recognition unit 12 by collating the input pattern and the reference pattern vector, can be utilized for the learning of the reference pattern vector. In concrete terms, the operation of multiplication-accumulation (inner product), which constitutes the principal operation in the recognition processing and the learning processing is carried out for the two processes according to similar handling processes. Accordingly, by using the processing section for the sum of the products in the recognition unit 12, which is in an idle state of the pattern recognition processing, it becomes possible to carry out learning of the reference pattern vector effectively in time, without formally setting the learning condition by forcibly interrupting the pattern recognition processing.

In the present invention, the idle state of the recognition process is a state such that recognition is not carried out after the recognition is completed. As shown in FIG. 10, when the recognition is completed, a signal for indicating the completion of the recognition is supplied from the recognition operation control section 32 to the learning operation control section 34 via the control section 40 in FIG. 2. The, the learning operation control section 34 controls the first operation processing section 30 such that the learning is carried out in the first operation processing section 30.

The device of the present embodiment will generate a substantial effect when it is applied, for example, to the case of recognizing syllables whose speech input is intermittently input on-line according to the dialogic form. The case of speech input will be described in what follows.

The pattern recognition device 10 comprises a preprocessing section 14 which converts the input speech to a pattern, a dictionary memory 16 for memorizing the dictionary for recognition, a recognition unit 12 which obtains the result of recognition for the input speech pattern by matching the input speech pattern from the preprocessing section 14 and the reference pattern vector in the dictionary memory 16, as well as carries out learning of the reference pattern vector in the dictionary memory 16 during the pausing duration of the recognition processing, and a display 18 and a keyboard 20 which carries out correction processing for the result of the pattern recognition. Connected to the recognition unit 12, there are arranged a correlation matrix (characteristic kernel) memory section 22, a memory section for interim state in learning 24, and an error/reject memory section 26.

The error/reject memory section 26 is for recording a newly input speech pattern and the result of the matching processing between the input speech pattern and the reference pattern vector, namely, the learning information such as the degree of similarity, when a recognition error or a recognition rejection for the input speech pattern has occurred in the midst of executing the recognition processing or learning processing in the recognition unit 12 in order to prepare for the learning of the reference pattern vector. The correlation matrix (characteristic kernel) memory section 22 is for recording the correlation matrix (characteristic kernel) of the correct category and the correlation matrix (characteristic kernel) of the erroneous category, or either one of the two kernels, when there was generated a recognition error or a recognition rejection. In addition, the interim state of learning memory section 24 is for recording the interim state in the learning of the reference pattern vector at the recognition unit 12.

It should be noted that the error/reject memory section 26 is sometimes constructed to form a part of the memory region of the correlation matrix (characteristic kernel) memory section 22 or the interim state learning memory section 24.

Figure 2:
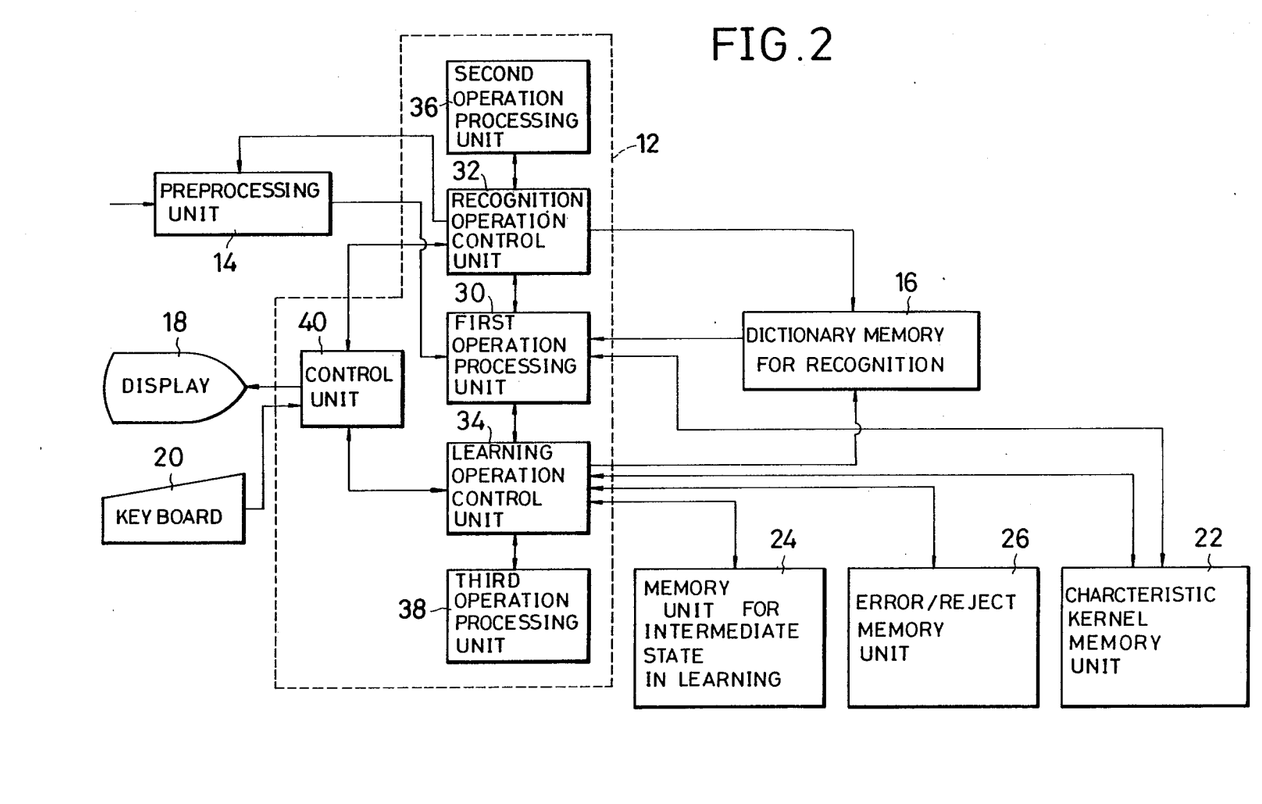
FIG. 2 is a block diagram for illustrating a more detailed construction of the recognition unit of the pattern recognition device shown in FIG. 1.

As shown in FIG. 2, the recognition unit 12 with the recognition function and the learning function includes a first arithmetic processing unit 30 which carries out the operation of multiplication-accumulation (inner product) that represents the principal operation in the recognition processing or the learning processing to be done upon receipt of the input speech pattern from the preprocessing section 14, a recognition operation control section 32 which controls the preprocessing section 14, and the dictionary memory 16 in order to carry out, for the purpose of recognition processing, the operation of multiplication-accumulation (inner product) for recognition at the first arithmetic processing unit 30, and a learning operation control section 34 which controls the first arithmetic processing unit 30 and the dictionary memory 16 in order to carry out, for learning processing, the operation of multiplication-accumulation (inner product) for learning at the first arithmetic processing unit 30. Connected to the recognition operation control section 32 there is installed a second arithmetic processing unit 36 for carrying out operations other than the operation of multiplication-accumulation (inner product) for recognition processing, for example, the sorting processing operation. Similarly, connected to the learning operation control section 34 there is installed a third arithmetic processing unit 38 for carrying out operations other than the operation of multiplication-accumulation (inner product) for the learning processing, such as the division for normalization. The recognition unit 12 further includes a control section 40 which judges, based upon the signals from the recognition operation control section 32 and the learning operation control section 34, whether or not it is possible to carry out learning of the reference pattern vector at the first arithmetic processing unit 30, and sorts out the information for correction processing which is sent from the keyboard 20 to the recognition operation control section 32 or the learning operation control section 34.

Figure 4A:
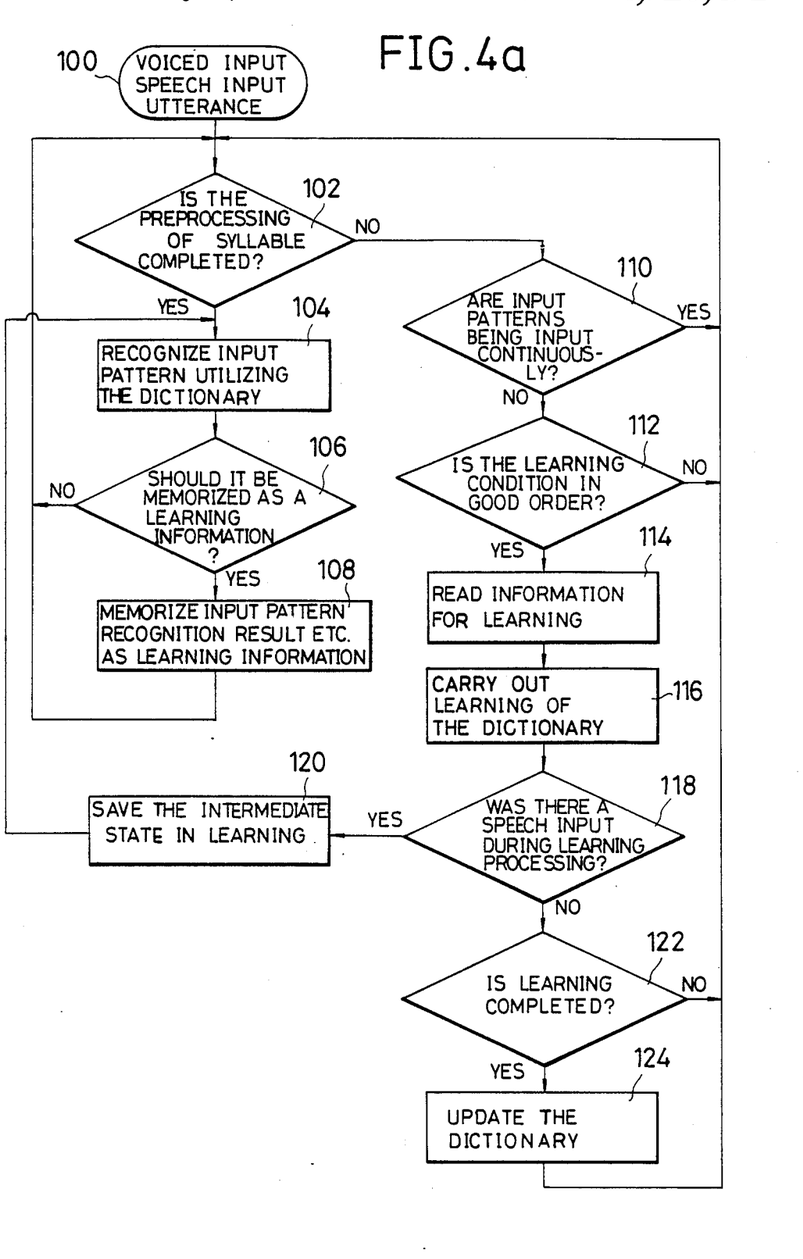
FIGS. 4a to 4b are flow charts for illustrating the processing operation of the pattern recognition device shown in FIG. 1.

Referring to FIG. 4a, the processing operation for the case of carrying out the recognition of a syllabic speech pattern in the pattern recognition device as shown in FIGS. 1 and 2 will be described.

In such a case, there is furnished in general a reference pattern vector for unspecified speakers. To begin, when the speaker inputs a syllable by voicing it in step 100, there is obtained an input speech pattern through the preprocessing section in step 102. Next, the input speech pattern is forwarded to the first arithmetic processing unit 30, and is processed for recognition operation by being collated with the reference pattern vector at the recognition operation control section 32 (step 104). The pattern recognition processing is carried out, for example, by the use of the well known Multiple Similarity Method or the partial space method. Then, in step 106, assume for example, that the syllable was erroneously recognized as "a" in spite of actual voicing of "pa", and whether or not the difference in the degrees of similarity between the input speech pattern and the respective reference pattern vectors for "a" and "pa" is slight, that is whether or not the input speech pattern is usable as a learning data, is recognized by the learning control section 34. If it is recognized in step 108 that it is usable as a learning data, then the input speech pattern and the result for its recognition will be memorized in the error/reject memory section 26 as a learning information. Next, in step 110, it is determined by the control section 40 whether or not the input speech pattern to be recognition-processed is being input continuously through the preprocessing section 14. If the input speech pattern is recognized to be input continuously, the processings for the steps 102 to 108 are repeated. If, for example, when the speaker is contemplating what is to be said next or when the inputting of the speech pattern is interrupted by the so-called pausing or the like, in other words, when learning is possible, then whether or not the learning condition for the reference pattern vector is in good order is recognized, based on the information for modification processing that comes from the control section 40, by the learning operation control section 34 (step 112). For instance, when it is known from the previously executed learning of the reference pattern vector that the errors made in recognizing "a", "pa", and "ta" are more than 10 times each, learning of the reference pattern vector will be carried out by judging that the learning conditions for "a", "pa", "ka", "ka" and "ta" are in good order. On the other hand, if the learning conditions are found to be not in good order, the processings in the steps 102 to 108 will be repeated.

When the learning conditions are in good order and the learning of the reference pattern vector is to be carried out in step 114, the learning information for pattern "a", for example, is read from the error/reject memory section 26 by the learning operation control section 34, to carry out the learning of the reference pattern vector (step 116). Here, learning of the reference pattern vector is to be executed, for example, by varying the rate of contribution of the input speech pattern to the correlation matrix (characteristic kernel) or the correlation matrix for the reference pattern vector, by the use of the K-L expansion, based on the input speech pattern and the correct name of the category that is to be input for correcting the recognition result. For example, when learning is to be executed by means of the result of recognition for the input speech pattern, the information given by the speaker indicating acceptance or rejection of the recognition result, the input speech pattern, other input speech patterns already memorized, and the compound similarity (multiple similarity), learning and updating of the reference pattern vector registered in the dictionary memory 16 are carried out by the use of the correlation matrix (characteristic kernel) and the confusion matrix that shows the error trend during the recognition. The process of learning will be described in detail later.

The learning of the reference pattern vector will be continued until all of the input speech patterns in the categories that form the learning object are exhausted. During the learning processing of the reference pattern vector, the reference pattern vector that is registered in the dictionary memory 16, is kept in the state as it is. If a speech is input during the learning processing, the control section 40 judges in step 118 that learning is not possible. Based on the result of judgment, the learning operation control section 34 saves the interim state in learning of the reference pattern vector at the first arithmetic processing unit 30 in the memory section for interim state in learning 24 (step 120). Then, it goes back to step 104 in which the recognition operation is processed by the recognition operation control section 32 through matching of the input speech pattern and the reference pattern vector in the first arithmetic processing unit 30. When it is recognized in step 110 that learning is possible, the interim state in learning of the reference pattern vector is reloaded by the learning operation control section 34 into the first arithmetic processing unit 30 from the interim state memory section 24, to resume the learning processing of the reference pattern vector. Then whether the learning is completed or not is decided in step 122 by the learning operation control section 34, and at the point in time where a new reference pattern vector is obtained by the completion of the learning, the reference pattern vector that is registered in the dictionary memory 16 is updated (step 124). Accordingly, after that point in time where the updating took place, recognition processing of an input pattern will be carried out by the use of the new modified reference pattern vector. The processings in the above are executed repeatedly and the reference pattern vector is updated successively to substantiate the dictionary. Therefore, as the learning of the reference pattern vector goes on, an improvement is expected in the recogntion factor of the input patterns.

With the operation as described in the above, the pattern recognition device 10 carries out speech recognition continuously as seen from the side of the user who inputs the speech.

Next, the learning processing at the first arithmetic processing unit 30 of the pattern recognition device 10 will be described in more detail.

The learning operation Control section 34 receives an information on the degree of similarity determined for each of the category of such an input pattern, from the error/reject memory section 26, and reads the correlation matrix (characteristic kernel) for the correct category and the correlation matrix (characteristic kernel) for the erroneous category, or one of the correlation matrix (characteristic kernel) of the two, from the correlation matrix (characteristic kernel) memory section 22, to update the correlation matrix (characteristic kernel) in the following manner.

Now, if it is assumed that the number of the categories to be recognized is L, and that each of the categories are designated by the numbers 1, 2, ..., l, ..., and L, then the correlation matrix (characteristic kernel) $K^{(l)}$ for the category (l) is represented by the following equation.

$$K^{(l)} = \sum_\alpha w_\alpha^{(l)} f_\alpha f_\alpha^T.$$

Here, $f\alpha$ is the speech pattern vector belonging to the category (l), $f^T$ is the transpose of the vector $f\alpha$, and $w\alpha^{(l)}$ is a proper coefficient. Next, if the correlation matrix (characteristic kernel) modified for n times is represented by $$K_n^{(l)} = \sum_\alpha w_{\alpha,n}^{(l)} f_\alpha f_\alpha^T, \quad (1)$$

the (n+1)-th modification in the present embodiment will be given by $$K_{n+1}^{(l)} = (1 - w^{(l)})K_n^{(l)} + w^{(l)}f_{ao}f_{ao}^T \quad (2)$$

In the above equation, $f_{ao}$ is the speech pattern for category (l) which is input at the time of the (n+1)-th modification, and $w^{(l)}$ is a predetermined coefficient. By substituting Eq.(1) into Eq.(2) one obtains $$K_{n+1}^{(l)} = (1 - w^{(l)}) \sum_\alpha \{w_{\alpha,n}^{(l)} f_\alpha f_\alpha^T\} + w^{(l)} f_{ao} f_{ao}^T. \quad (3)$$

Therefore, by the (n+1)-th modification the coefficient corresponding to the input speech pattern $f_{ao}$ is modified according to $$w_{ao,n}^{(l)} \rightarrow w_{ao,n}^{(l)} + (1 - w_{ao,n}^{(l)}) w^{(l)} \quad (4)$$

and the coefficient corresponding to other speech pattern in category (l) is changed by $$w_{\alpha,n}^{(l)} \rightarrow (1 - w^{(l)}) w_{\alpha,n}^{(l)} \quad (5)$$

Namely, if $w^{(l)} > 0$, then the input speech pattern $f_{ao}$ will be assigned more importance than other speech patterns by these modifications, if $w^{(l)} < 0$, the input speech pattern $f_{ao}$ will be given less significance than other speech patterns, and if $w^{(l)} = 0$, the situation will be maintained the same as before.

With the contents of the correlation matrix (characteristic kernel) memory section 22 modified as in the above, the eigenvalve problem for the modified correlation matrix (characteristic kernel) will now be solved. The eigenvalue problem can be solved by incorporating a well-known solution program for the eigenvalue problem, such as "Jacobi method", in the microcomputer or the minicomputer. As described in the above, it becomes possible to obtain an updated reference pattern vector by solving the eigenvalue problem for the correlation matrix (characteristic kernel). Here, it may be arranged at this point in time to send a signal that indicates the completion of learning to the modification terminal to request a confirmation from the user of the reference pattern vector learned as in the above. By so doing, it becomes possible for the user to check the validity of the learning of the reference pattern vector, prior to the updating of the reference pattern vector that is registered in the dictionary memory 16. When the reference pattern vector may be updated, the learning processing completes by the storing of the new reference pattern vector in the dictionary memory 16.

Figure 4B:
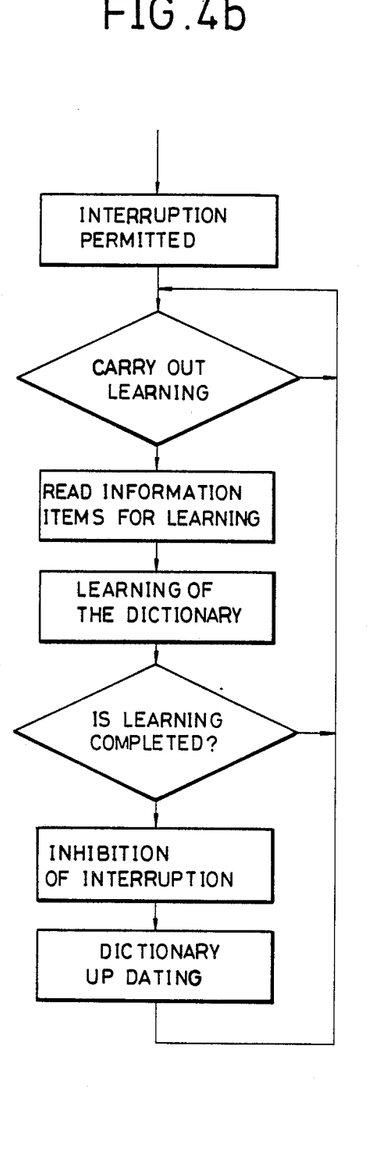
Figure 4C:
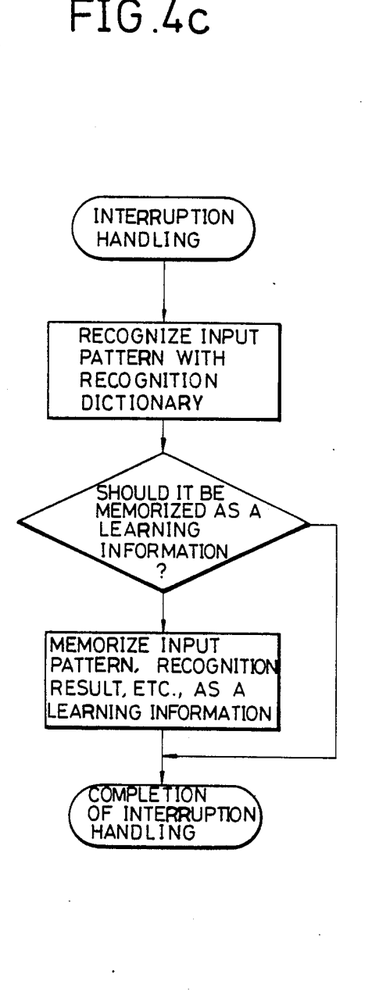

The flowcharts in FIGS. 4b and 4c disclose a recognition process of the handwritten character patterns by the pattern recognition device in accordance with the present invention. In the case of inputting handwritten characters, due to the relatively small input speed, the recognition and the learning for the input patterns are carried out as interruption processings when the processing is completed.

Namely, the control section 40 is constructed for controlling the recognition operation control section 32 and the learning operation control section 34 so as to carry out the interruption processings in accordance with a signal signifying completion of the preprocessing from the preprocessing section 14; and, when the recognition of the input pattern is completed, the learning processing, namely the background processing as shown in FIG. 4b is carried out. Furthermore, in updating the reference patterns, the processing loop is constructed in such a way as to forbid the interruption of the recognition, which utilizes the reference patterns, until the completion of updating of the reference patterns as shown in FIG. 11.

By referring to FIGS. 4b and 4c, recognition of the handwritten character patterns by the first embodiment of the pattern recognition device will now be described. In FIG. 4b is illustrated the learning processing that operates as a background processing while in FIG. 4c is illustrated the interruption processing of the recognition processing that is generated for the recognition unit 12 for every time at the completion of the preprocessing for the input character pattern. Namely, in the case of inputting handwritten characters, due to the small speed in which the inputting is made, the recognition processing for the input pattern is arranged to be actuated as an interruption for the recognition section 12 at the point in time where the pattern inputting (the preprocessing) is completed.

Figure 9A:
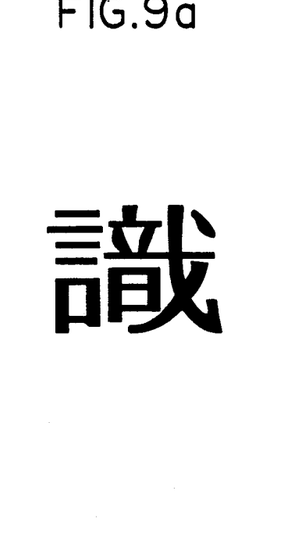
Figure 9B:
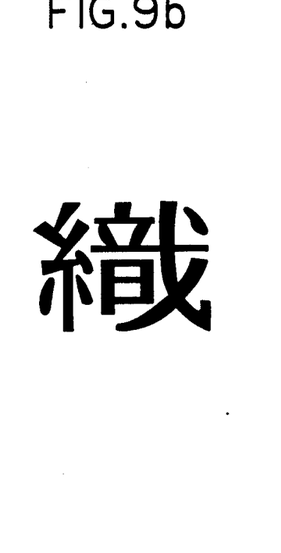

When the preprocessing for the input character pattern is completed, the interruption processing is actuated as shown in FIG. 4c, and the input pattern is recognized by collating it against the reference pattern vector. Here, if in spite of handwriting, for example, of Chinese character "shiki", shown in FIG. 9a, it was recognized erroneously as Chinese character "shoku", shown in FIG. 9b, and if the difference in the degrees of similarity between the reference pattern vector for respective category and the input pattern is slight, then the input pattern, the information on the degrees of similarity, and others are memorized as the learning data. When the recognition processing of the input pattern by the interruption processing is completed, the background processing, that is, the learning processing, will be carried out, as shown in FIG. 4b. The learning processing that is executed as the background processing is basically similar to the learning processing as shown FIG. 4a. Although the recognition processing is being arranged to be enabled through appropriate interruption while the learning of the reference pattern vector is executed in the allowed state of interruption, in updating the reference pattern vector, the processing loop is constructed in such a way as to forbid the interruption of recognition processing which utilizes the reference pattern vector, until the completion of updating of the reference pattern vector. In this manner, it is arranged that the learning of the reference pattern vector and the recognition processing of the input by the use of the reference pattern vector can be carried out by making use of a common recognition unit 12.

As has been described in the foregoing, by the use of the device of the present embodiment, the learning processing of the reference pattern vector is carried out by utilizing the pausing period for the recognition processing of the recognition unit 12. Therefore, in comparison to the conventional method in which the learning processing is carried out en bloc, it becomes possible to carry out dictionry updating without being conscious of the duration for learning processing, not only for the user who uses the device constantly but also for the user who uses it temporarily. In addition, it becomes possible to achieve a substantial improvement in the recognition factor through updating of the reference pattern vector by an effective use of the first arithmetic processing unit 30 without incurring losses in time. It is noted that the effective learning systems that are available presently carry out learning processing repeatedly on the numerous data that are collected based principally on the statistical processing, with the sum of the products as its basis. It then requires a powerful operational capability. In contrast, the present device which carries out learning of the reference pattern vector, as described in the foregoing, is extremely effective in the case of realizing, in particular, a pattern recognition device with high precision. Moreover, taking the advancement in the operational devices into account, the present invention will be extremely effective in realizing a high precision pattern recognition device with more functions.

Figure 5:
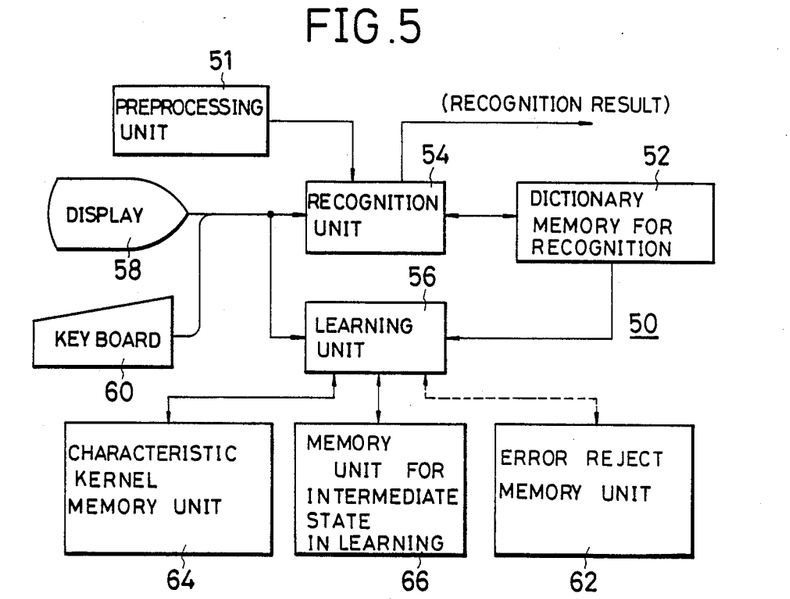
FIG. 5 is a simplified block diagram for another embodiment of the pattern recognition device in accordance with the present invention.

Referring to FIG. 5, a second embodiment of the pattern recognition device in accordance with the present invention is shown with reference numeral 50.

Figure 7A:
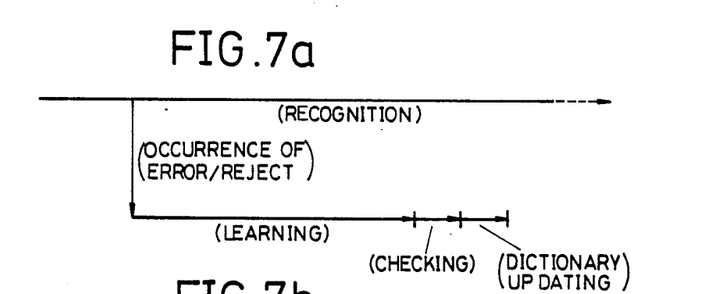
FIGS. 7a and 7b are timing charts for illustrating the timing of the second embodiment shown in FIG. 5.
Figure 7B:
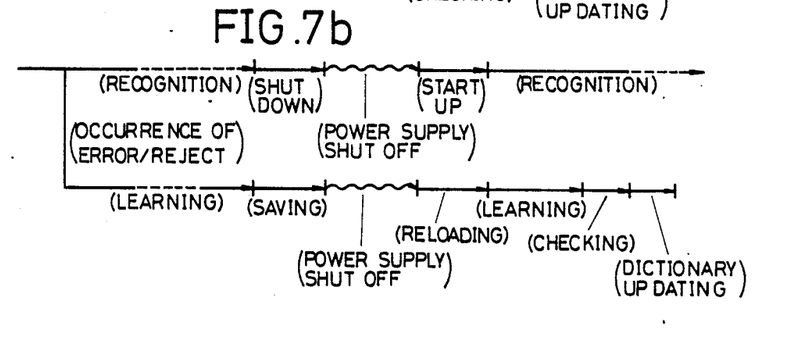

The pattern recognition device 50 comprises a preprocessing section 51 which converts the input into a pattern, a dictionary memory for recognition 52, which memorizes the reference pattern vector, a recognition unit 54 which determines the recognition result for the input pattern by collating the input pattern and the reference pattern vector in the dictionary memory for recognition 52, a learning section 56 which causes the learning of the reference pattern vector which is in the dictionary memory for recognition 52, a display 58 which carries out modification processing for the result of pattern recognition, and a keyboard 60. The recognition unit 54 and the learning section 56 are provided with an arithmetic processing unit with identical construction and are arranged to operate in parallel fashion, as shown by FIGS. 7a and 7b, when it becomes necessary to carry out learning of the reference pattern vector. Analogous to the case of the first embodiment described earlier, it becomes possible to achieve the construction effect in which learning of the reference pattern vector can be carried out without forcibly interrupting the processing of pattern recognition, permitting to achieve an improvement in the recognition capabilities of the reference pattern vector. The learning section 56 includes an error/reject memory section 62 which memorizes, when there is generated a recognition reject or a recognition error for a newly input pattern during execution of learning processing in preparation of learning of the reference pattern vector, the input pattern and the result of matching processing between the input pattern and the reference pattern vector, a correlation matrix (characteristic kernel) memory section 64 which memorizes the correlation matrix (characteristic kernel) for the correct category and the correlation matrix (characteristic kernel) for the erroneous category, or either one of these correlation matrices (characteristic kernels), that are to be used at the time of occurrence of a recognition reject or a recognition error, and a memory section for interim state in learning 66 which memorizes the interim state in the learning of the recognition dictionary at the recognition unit 54. The error/reject memory section 62 may be constructed as a part of the memory region for the correlation matrix (characteristic kernel) memory section 64 or the memory section for interim state in learning 66.

Figure 6:
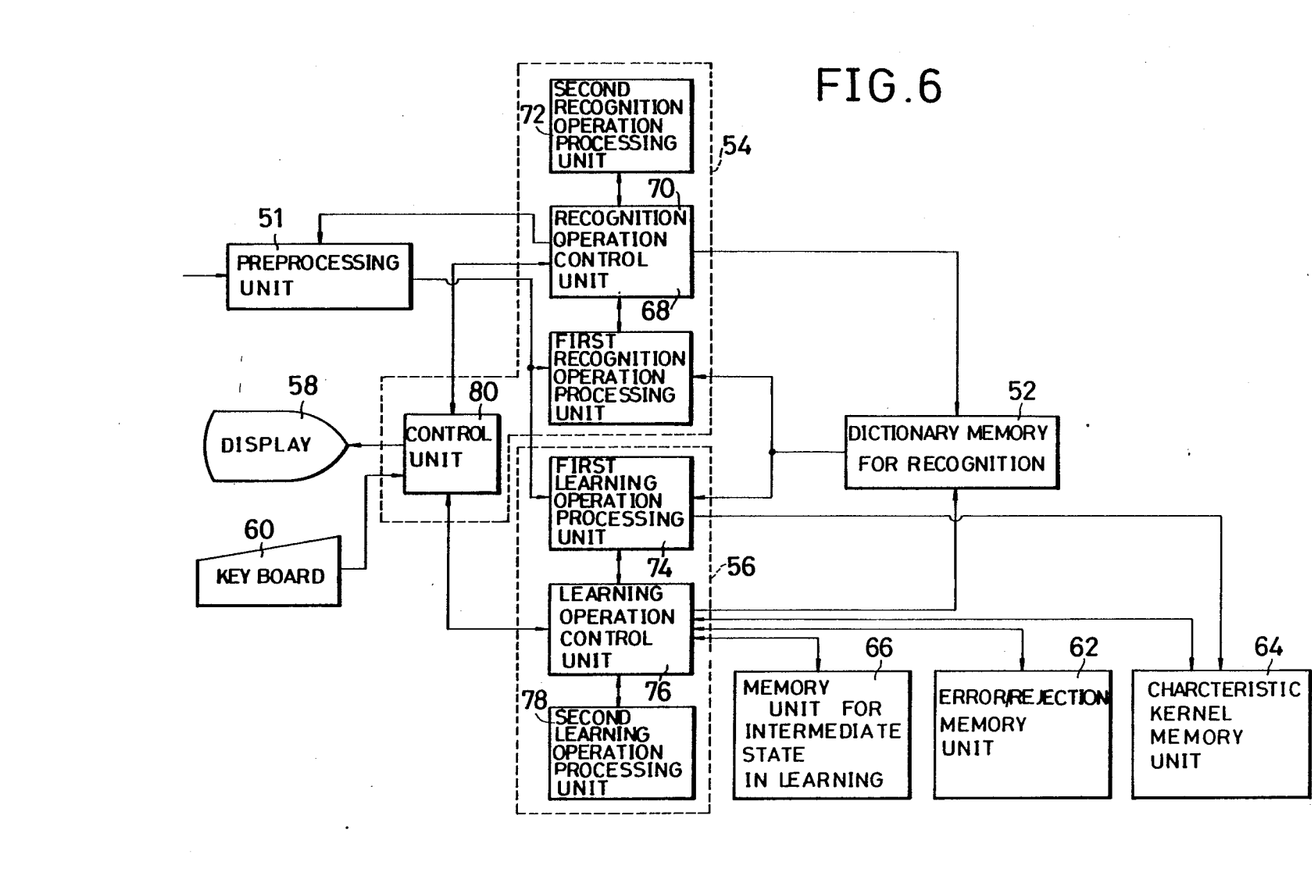
FIG. 6 is a block diagram for illustrating a more detailed construction of the pattern recognition device shown in FIG. 5.

As shown in FIG. 6, the recognition section 54 includes a first recognition arithmetic processing unit 68 which carries out the operation of multiplication-accumulation (inner product) that represents the principal operation in the recognition processing, by receiving an input pattern from the preprocessing section 51, and a recognition operation control section 70 that controls the preprocessing section 51, the first recognition arithmetic processing unit 68, and the dictionary memory 52, in order to carry out the operation of multiplication-accumulation (inner product) for recognition at the first recognition arithmetic processing unit 68. In the recognition operation control section 70 there is provided a second recognition arithmetic processing unit 72 which carries out operations, such as the sorting processing operation, other than the operation of multiplication-accumulation (inner product) in the recognition operation. The learning section 56 includes a first learning arithmetic processing unit 74 which carries out the operation of multiplication-accumulation (inner product) that represents the principal operation in the learning processing, by receiving an input pattern from the preprocessing section 51, and a learning operation control section 76 which controls the preprocessing section 51, the first learning arithmetic processing unit 74, and the dictionary memory 52, in order to carry out the sum of the products operation for learning at the first learning arithmetic processing unit 74. In the learning operation control section 76 there is provided a second learning arithmetic processing unit 78 which carries out operations, such as the division for normalization, other than the operation of multiplication-accumulation (inner product) in the learning processing. The recognition unit 54 further includes a control section 80 which detects the occurrence of a recognition error or reject for the input pattern by means of a signal from the recognition operation control section 70, and supplies an information for the modification processing from the keyboard 60 to both of the recognition operation control section 70 and the learning operation control section 76, in order to be able to carry out the learning processing in parallel with the recognition processing in the recognition unit.

Next, the operation of the second embodiment will be discribed. First, when a handwritten character, for example, is input, an input character pattern is found through the preprocessing section 51. Then, the input character pattern is forwarded to the recognition arithmetic processing unit 68 and is processed for recognition operation by being collated with the reference pattern vector at the recognition operation control section 70. If a recognition rejection or a recognition error takes place for the input character pattern in this stage, then the control section 80 detects the occurrence of such a recognition reject or error, and supplies an information on the correct category for the input character pattern coming from the keyboard 60 to the recognition operation control section 70 and the learning operation control section 76. Here, the recognition operation control section 70 extracts respectively the degree of similarity between the input character pattern and the erroneous category and the degree of similarity between the input character pattern and the reference pattern vector pattern with correct category. The learning operation control section 76 receives an information on the degrees of similarity determined for the input character pattern with each of the categories, reads the correlation matrix (characteristic kernel) for the correct category and the correlation matrix (characteristic kernel) for the erroneous category, or one of the two correlation matrices (characteristic kernels), from the correlation matrix (characteristic kernel) memory section 64, and updates the correlation matrix (characteristic kernel) as was described earlier.

By solving the eigenvalue problem for the correlation matrix (characteristic kernel), subsequent to the above, it becomes possible to obtain a recognition dictionary which is updated. At this stage, it may be arranged to let the user confirm the reference pattern vector learned as in the foregoing, by sending a signal that indicates the completion of learning to the modification terminal. By so arranging, it becomes possible for the user to check the validity of the learning of the reference pattern vector before updating the reference pattern vector which is registered in the dictionary memory 52. When the updating of the reference pattern vector is warranted, the learning processing is completed with the storing of the new reference pattern vector in the dictionary memory 52.

Now, however, the process of learning the reference pattern vector takes a long time in general. Moreover, since the above process is executed independently of the recognition processing for the input pattern, there is a possibility that the learning of the reference pattern vector is not completed yet at the time when the power supply for the device is shut off accompanying the completion of the recognition processing. If such a situation occurs, the interim state in learning of the reference pattern vector, that is being done in the first learning arithmetic processing unit 74, is saved in the memory section for the interim state 66 by the learning operation control section 76. The simplest method for saving such an information is to save all of the program region for learning of the reference pattern vector, the data region, the execution address, and its status flag. Of these, there exists no absolute need for saving the program region provided that there is a guarantee that it will not be changed during the execution of the recognition processing. Next, when the pattern recognition processing resumes under the turning-on of the power supply for the device, the information on the kernels that has been saved in the memory section for interim state in learning 66 is reloaded in the first learning arithmetic processing unit 74. Using the execution address in the information, learning of the reference pattern vector is resumed. In FIGS. 7a and 7b are illustrated examples of the time flow of such a process.

In this manner, by the use of the present device it becomes possible to achieve a construction effect for the reference pattern vector by carrying out learning of the reference pattern vector without interrupting the processing for the pattern recognition and to aim at an improvement in the recognition capabilities of the dictionary. In additon, there will be obtained such effects as being able to carry out with extreme ease the development and substantiation of the reference pattern vector which previously required much labor and an enormous amount of time.

Figure 8:
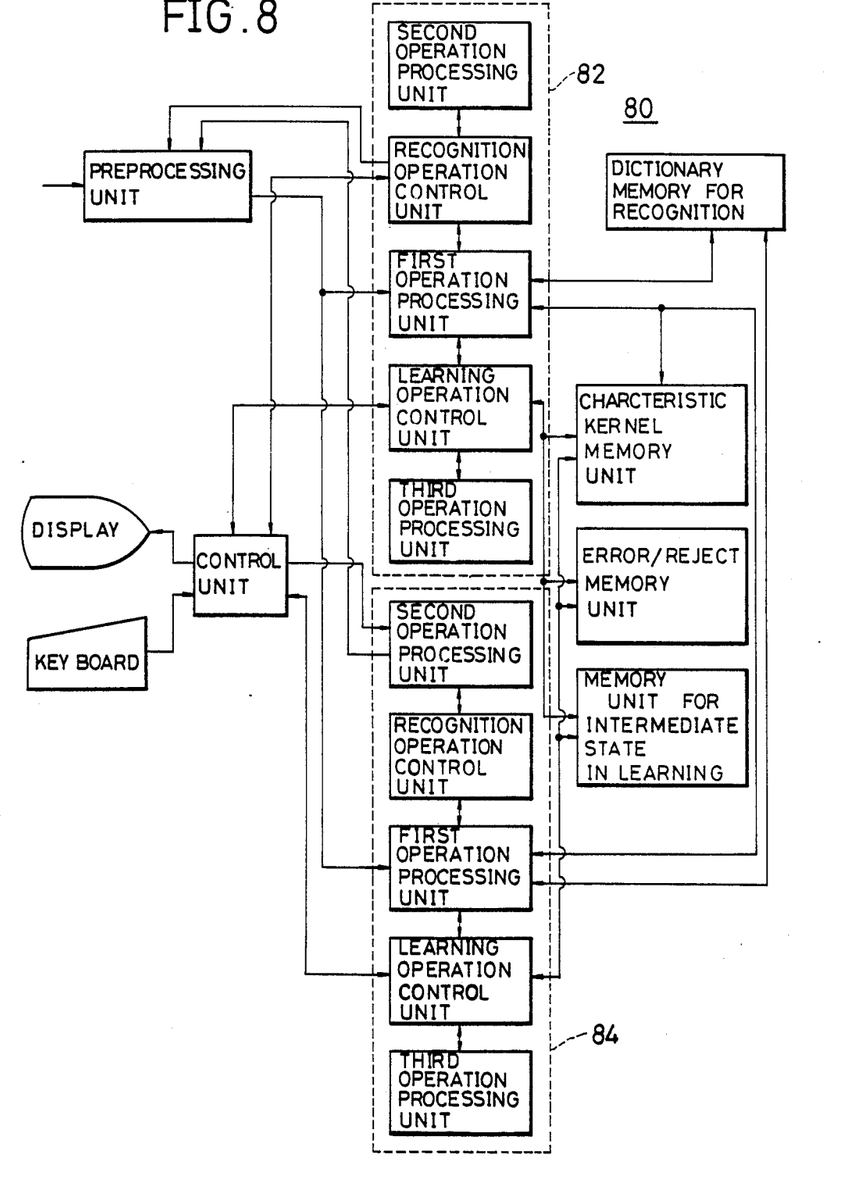
FIG. 8 is a block diagram for a third embodiment of the pattern recognition device in accordance with the present invention.

Referring to FIG. 8, a third embodiment of the pattern recognition device in accordance with the present invention is shown with reference numeral 80.

The pattern recognition device 80 includes, similarly to the first embodiment shown in FIG. 2, a recognition unit that has the learning function and the recognition function, with a construction which enables parallel processings of learning and recognition at the recognition units 82 and 84, respectively. Accordingly, the concrete construction for the recognition units 82 and 84 is similar to that of the recognition unit 12 of the first embodiment, so that no further explanation about it will be given.

It is to be noted that the present invention should not be limited to the embodiments described in the foregoing. Thus, for example, as to the kinds of the characteristic vectors that represent the input patterns and the pattern recognition methods that make use of the characteristic vectors, various systems that have been known hitherto may appropriately be applied depending upon their purposes of use. Moreover, although the description about these embodiment has been made in conjunction with the speech recognition for syllables and the recognition of handwritten characters, they may also be applied to the recognition of other types of patterns. Moreover, the present invention can be applied to the device irrespective of their use for specified users or for unspecified users. Furthermore, the present invention is applicable not only to the syllable speech recognition and the handwritten character recognition but also to the pattern inputting device for recognizing the patterns input by means of a dictionary for recognition, such as the devices for word speech recognition, continued numeral recognition, and inputting handwritten drawings. In short, the present invention may be applied in various modified forms within the range which does not deviate from the features of the invention.

Moreover, various modifications will become possible for those skilled in the art after receiving the teachings of the present disclosure without departing from the scope thereof.

What is claimed is:

1. A pattern recognition device which carries out a recognition of input patterns by matching input patterns that are inputted successively with reference patterns, each reference pattern prepared in the form of a pattern vector by use of KL expansion for a characteristic kernel, comprising:
   said pattern recognition device;
   a reference pattern memory registering reference patterns in advance;
   a recognition means for carrying out recognition by matching between an input pattern and a reference pattern in said reference pattern memory;
   a learning means for carrying out learning of reference patterns by adjusting elements of each kernel in accordance with input patterns, said recognition means and learning means sharing one multiply and accumulate operator;
   a control unit constructed to control said recognition means and said learning means such that learning of reference patterns is carried out in said multiply and accumulate operator when recognition in said recognition means is halted for absence of input patterns and wherein learning of said reference patterns is interrupted when recognition is resumed; and
   an intermediate memory storing an intermediate state of learning which is interrupted by resuming recognition such that recognition and learning is successively performed.

2. The pattern recognition device as claimed in claim 1, further comprising a first operation processing section for carrying out recognition and learning.

3. The pattern recognition device as claimed in claim 2, wherein said first operation processing section is constructed to carry out a sum of products operation of recognition and learning.

4. The pattern recognition device as claimed in claim 3, wherein said control unit comprises a recognition operation control section controlling said first operation processing section and said reference pattern memory in order to carry out a sum of the products operation of recognition at said first operation processing section when executing recognition, a second operation processing section carrying out operations other than said sum of the products operation of recognition, a learning operation control section controlling said first operation processing section sand said reference pattern memory in order to carry out sum of the products operation of learning at said first operation processing section when executing learning, a third operation processing section carrying out operations other than said sum of the products operation of learning, and a control section constructed to control said recognition operation control section and said learning operation control section.

5. The pattern recognition device as claimed in claim 4, wherein said control unit is constructed to control said first operation processing section such that learning of said reference patterns is started in said first operation processing section in accordance with a signal indicating completion of recognition supplied from said recognition operation control section.

6. A pattern recognition device which carries out recognition of input patterns by matching input patterns that are inputted successively with reference patterns, each reference pattern being prepared in the form of a pattern vector by use of KL expansion for a characteristic kernel, comprising:
   said pattern recognition device;
   a reference pattern memory registering reference patterns;
   a first operation processing section carrying out a sum of the products operation of recognition of said input patterns and/or a sum of the products operation of learning of said reference patterns;
   a recognition operation control section controlling, when recognition is carried out, said first operation processing section and said reference pattern memory in order to carry out said sum of the products operation of said recognition at said first operation processing section;
   a second operation processing section carrying out operations other than said sum of the products operation of said recognition;
   a learning operation control section controlling, when learning is carried out, said first operation processing section and said reference pattern memory in order to carry out said sum of the products operation of said learning at said first operation processing section;
   a third operation processing section carrying out operations other than said sum of the products operation of said learning;
   a control section means for controlling said recognition operation control section and said learning operation control section such that said sum of the products operation of said learning of said reference patterns is carried out at said first recognition processing section, when said sum of the products operation of said recognition in said first recognition processing section is completed, such that said first recognition processing section is successively operated; and
   a memory storing an intermediate state of learning which is interrupted by resuming recognition.

7. A pattern recognition device comprising:
   an input unit through which patterns to be recognized are inputted to said device;
   an operation unit generating products and sums;
   a characteristic kernel memory storing characteristic kernels;
   a recognition unit recognizing input patterns in cooperation with said operation unit by matching input patterns with reference patterns, each reference pattern prepared in the form of a pattern vector by use of KL expansion for a characteristic kernel stored in said characteristic kernel memory; and a learning means for carrying out learning of reference patterns by modifying elements of at least one characteristic kernel with reference to said input patterns in cooperation with said operation unit, and wherein;

said operation unit begins operation for generating products and sums that are required for modification of characteristic kernels when a recognition process is halted;

when a flow of pattern input is stopped said operation unit halts operation required for recognition and begins operation required for modification; and when said flow is resumed, said operation unit switches from operation required for modification to operation required for recognition at which time an intermediate result of said operation required for modification is stored in an intermediate memory.

* * * * *